(12) United States Patent
Zhang

(10) Patent No.: US 11,590,867 B2
(45) Date of Patent: Feb. 28, 2023

(54) SOFTNESS ADJUSTING DEVICE FOR VEHICLE SEAT, VEHICLE SEAT, AND VEHICLE

(71) Applicant: LANGFANG GOLDEN TIME TECHNOLOGY DEVELOPMENT CO., LTD., Hebei (CN)

(72) Inventor: Haitao Zhang, Hebei (CN)

(73) Assignee: LANGFANG GOLDEN TIME TECHNOLOGY DEVELOPMENT CO., LTD., Hebei (CN)

(*) Notice: Subject to any disclaimer, the term of this patent is extended or adjusted under 35 U.S.C. 154(b) by 0 days.

(21) Appl. No.: 17/296,973

(22) PCT Filed: Oct. 20, 2020

(86) PCT No.: PCT/CN2020/122226
§ 371 (c)(1),
(2) Date: May 25, 2021

(87) PCT Pub. No.: WO2021/135527
PCT Pub. Date: Jul. 8, 2021

(65) Prior Publication Data
US 2022/0055512 A1    Feb. 24, 2022

(30) Foreign Application Priority Data
Dec. 30, 2019    (CN) .......................... 201911398326.3

(51) Int. Cl.
*B60N 2/68*    (2006.01)
*B60N 2/70*    (2006.01)
*B60N 2/56*    (2006.01)

(52) U.S. Cl.
CPC .......... *B60N 2/7088* (2013.01); *B60N 2/5657* (2013.01)

(58) Field of Classification Search
CPC ...... B60N 2/914; B60N 2/665; B60N 2/7088; B60N 2/5657
See application file for complete search history.

(56) References Cited

U.S. PATENT DOCUMENTS

| 4,592,588 A |   | 6/1986 | Isono et al. |
| 4,965,899 A | * | 10/1990 | Sekido .................. A47C 7/467 |
|   |   |   | 297/284.6 |

(Continued)

FOREIGN PATENT DOCUMENTS

| CN | 203511379 U | 4/2014 |
| CN | 111055738 A | 4/2020 |

(Continued)

OTHER PUBLICATIONS

International Search Report in PCT/CN2020/122226.
(Continued)

*Primary Examiner* — Shin H Kim
(74) *Attorney, Agent, or Firm* — FisherBroyles, LLP; James J. Pohl

(57) ABSTRACT

A softness adjusting device for a vehicle seat is arranged under the seat cover of the vehicle seat and includes a soft inflatable bag and a valve component arranged outside the soft inflatable bag. The valve component includes a throttle valve and a one-way check valve. The throttle valve is configured to block or communicate a gas in the soft inflatable bag from or with an external air source. The one-way check valve provides a flow direction from outside to inside and is configured to fill the soft inflatable bag with the external air source when the pressure of the external air source is greater than air pressure in the cavity of the soft inflatable bag. The soft inflatable bag is filled with at least one flexible filler.

19 Claims, 11 Drawing Sheets

(56) References Cited

U.S. PATENT DOCUMENTS

| | | | | |
|---|---|---|---|---|
| 5,860,699 | A * | 1/1999 | Weeks | A47C 7/467 |
| | | | | 297/284.6 |
| 6,088,642 | A | 7/2000 | Finkelstein et al. | |
| 6,349,991 | B1 * | 2/2002 | Jaekel | B60N 2/665 |
| | | | | 297/284.6 |
| 7,350,851 | B2 * | 4/2008 | Barvosa-Carter | ........................... |
| | | | | B60N 2/42709 |
| | | | | 296/187.02 |
| 10,086,730 | B2 * | 10/2018 | Dry | F16K 15/20 |
| 11,312,278 | B2 * | 4/2022 | Mazzucchelli | B60N 2/665 |
| 2006/0202492 | A1 * | 9/2006 | Barvosa-Carter | B60N 2/914 |
| | | | | 293/107 |
| 2010/0327636 | A1 * | 12/2010 | Stoll | B60N 2/5621 |
| | | | | 296/146.7 |
| 2012/0011657 | A1 * | 1/2012 | Kovacs | A47C 27/18 |
| | | | | 5/709 |
| 2016/0207429 | A1 * | 7/2016 | Fitzpatrick | B60N 2/646 |
| 2019/0049026 | A1 | 2/2019 | Beuschel et al. | |
| 2020/0238874 | A1 * | 7/2020 | Mazzucchelli | B60N 2/914 |
| 2022/0055512 | A1 * | 2/2022 | Zhang | B60N 2/7088 |

FOREIGN PATENT DOCUMENTS

| | | |
|---|---|---|
| DE | 20 2017 103 162 U1 | 5/2018 |
| EP | 3 093 186 A1 | 11/2016 |
| FR | 2 988 344 A1 | 9/2013 |
| WO | 2012/087155 A2 | 6/2012 |

OTHER PUBLICATIONS

Written Opinion of the International Search Report in PCT/CN2020/122226.

International Preliminary Report on Patentability for International Application No. PCT/CN2020/122226 dated Jul. 5, 2022, 5 pages.

* cited by examiner

SOFTNESS ADJUSTING DEVICE FOR VEHICLE SEAT, VEHICLE SEAT, AND VEHICLE

CROSS-REFERENCE TO RELATED APPLICATIONS

The present disclosure is a U.S. National Phase application, filed under 35 U.S.C. § 371, of International Patent Application No. PCT/CN2020/122226, filed on Oct. 20, 2020, which claims priority from Chinese Application No. 201911398326.3, filed on Dec. 30, 2019, entitled "Softness Adjusting Device for Vehicle Seat, and Vehicle Seat", each of which is incorporated herein by reference in its entirety.

TECHNICAL FIELD

The present disclosure generally relates to the technical field of vehicle seats, and in particular to a softness adjusting device for a vehicle seat, a vehicle seat, and a vehicle.

BACKGROUND ART

In recent years, with people's understanding and improvement of comfort of seats, people have gradually realized that intelligent adjustability of softness (or hardness) of the surface of a seat has important significance and influence on the enhancement and research of comfort, in addition to the fact that a comfortable seat is traditionally believed to have a good wrap-around ergonomic design and good softness, breathability, and supporting capability.

Prior art structures for adjusting softness of seats by means of air have the following disadvantages. Softness Adjusting Devices for vehicle seats have high cost due to the use of electronic components and air distribution structures such as solenoid valves, air pumps and controllers, and high maintenance costs are also required when circuits and components fail.

SUMMARY

The present disclosure provides a softness adjusting device for a vehicle seat, a vehicle seat, and a vehicle, which enables the adjustment of softness of the seat and is manufactured with low cost.

Embodiments of the present disclosure may be implemented as follows:

An embodiment of the present disclosure provides a softness adjusting device for a vehicle seat, configured to be arranged under a seat cover of the vehicle seat. The softness adjusting device for a vehicle seat includes a soft inflatable bag and a valve component arranged outside the soft inflatable bag. The valve component includes a throttle valve and a one-way check valve. The throttle valve is configured to block or communicate a gas in the soft inflatable bag from or with an external air source. The one-way check valve provides a flow direction from outside to inside and is configured to fill the soft inflatable bag with the external air source when the pressure of the external air source is greater than air pressure in a cavity of the soft inflatable bag. The soft inflatable bag is filled with at least one flexible filler.

Optionally, the softness adjusting device for a vehicle seat further includes a first air path and a second air path. The first air path and the second air path lead to the cavity of the soft inflatable bag. The throttle valve is mounted in the first air path. The one-way check valve is mounted in the second air path.

Alternatively, the softness adjusting device for a vehicle seat further includes a main air pipe, a first air path, and a second air path. One end of the main air pipe communicates with the cavity of the soft inflatable bag, and the other end of the main air pipe communicates with both one end of the first air path and one end of the second air path. The throttle valve is mounted in the first air path. The one-way check valve is mounted in the second air path.

Optionally, the valve component further includes an overflow valve. The overflow valve is configured to discharge the gas from the soft inflatable bag so that the pressure in the soft inflatable bag is reduced to a set pressure when the pressure in the soft inflatable bag is greater than or equal to the set pressure.

Optionally, at least two of the throttle valve, the one-way check valve, and the overflow valve are arranged integrally.

Optionally, the soft inflatable bag is provided with a height limiting structure configured to limit an expansion height of the soft inflatable bag when it is squeezed.

Optionally, the height limiting structure includes penetrating-type height limiting straps and/or built-in height limiting straps arranged in a distributed manner.

The penetrating-type height limiting strap has an I-shaped vertical section, the penetrating-type height limiting strap has two ends protruding beyond the soft inflatable bag, and the penetrating-type height limiting strap has a vertical portion located in the soft inflatable bag.

The built-in height limiting strap has two ends fixed to upper and lower inner surfaces of the soft inflatable bag, respectively.

Optionally, the throttle valve is a manual valve or a solenoid valve.

Optionally, the soft inflatable bag is composed of two or more sub-bags. The sub-bags communicate with each other via a connecting tube.

Optionally, the soft inflatable bag has a thickness ranging from 1 cm to 5 cm.

Optionally, the number of the soft inflatable bags is greater than or equal to two, and all or some of a plurality of soft inflatable bags are arranged in a stacked manner.

Optionally, the plurality of soft inflatable bags are provided with independent valve components, respectively, or the valve component is shared by all or some of the plurality of soft inflatable bags.

Optionally, the soft inflatable bag is provided with a number of air guide channels distributed to extend therethrough, and the air guide channels are isolated from the cavity of the soft inflatable bag and configured to conduct the gas on both sides of the soft inflatable bag.

Optionally, the flexible filler is at least one of sponge, aerosol, a three-dimensional woven fabric, a rubber elastic structure, and a fiber cushion layer.

An embodiment of the present disclosure further provides a softness adjusting device for a vehicle seat, configured to be arranged under a seat cover of the vehicle seat. The softness adjusting device for a vehicle seat includes a soft inflatable bag and a throttle valve arranged outside the soft inflatable bag. The throttle valve is configured to block or communicate a gas in the soft inflatable bag from or with an external air source. The soft inflatable bag is filled with at least one flexible filler.

An embodiment of the present disclosure further provides a vehicle seat. The vehicle seat includes a seat foam and a seat cover covering the seat foam. The softness adjusting device for a vehicle seat mentioned above is arranged between the seat foam and the seat cover.

Optionally, an inflatable bag reserving groove is provided in a side of the seat foam adjacent to the seat cover. The soft inflatable bag is placed in the inflatable bag reserving groove.

Optionally, a covering layer is arranged between the soft inflatable bag and the seat cover.

Optionally, a heating pad is arranged between the seat foam and the seat cover.

Optionally, an air guiding pocket is arranged under the soft inflatable bag, and a fan is arranged under the air guiding pocket.

An embodiment of the present disclosure further provides a vehicle, which includes the vehicle seat mentioned above.

Compared with the prior art, the embodiments of the present disclosure include, for example, the following advantageous effects:

The above-mentioned technical solution of the present disclosure provides a softness adjusting device for a vehicle seat consisting mainly of a soft inflatable bag as well as a throttle valve and a one-way check valve connected to the soft inflatable bag, and the soft inflatable bag is filled with a flexible filler. In this way, it is possible to provide two (hard and soft) seat states by simply closing or opening the throttle valve, respectively. The one-way check valve is designed to avoid outflow of a gas in the hard state on the one hand and to provide the soft inflatable bag with an airflow passage capable of restoring air pressure during state transition on the other hand. On the whole, the device enables the adjustment of softness of the seat and is manufactured with low cost.

BRIEF DESCRIPTION OF THE DRAWINGS

Other features, objects, and advantages of the present disclosure will become more apparent by reading the detailed description of non-limiting embodiments with reference to the following drawings.

REFERENCE NUMERALS IN THE FIGURES

Figure 1:
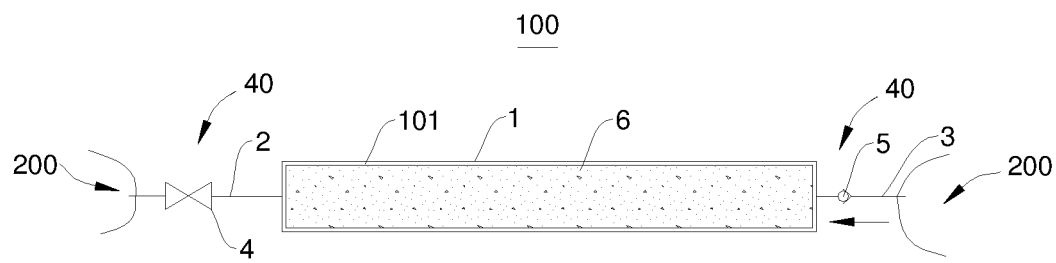
FIG. 1 is a schematic diagram of a first softness adjusting device for a vehicle seat according to an embodiment of the present disclosure.

100—softness adjusting device for a vehicle seat; 1—soft inflatable bag; 1a—first soft inflatable bag; 1b—second soft inflatable bag; 1c—third soft inflatable bag; 101—cavity; 2—air path; 2a—first air sub-path; 2b—second air sub-path; 2c—fifth air sub-path; 3—second air path; 3a—third air sub-path; 3b—fourth air sub-path; 3c—sixth air sub-path; 40—valve component; 4—throttle valve; 4a—first throttle valve; 4b—second throttle valve; 4c—third throttle valve; 5—one-way check valve; 5a—first one-way check valve; 5b—second one-way check valve; 5c—third one-way check valve; 6—flexible filler; 6a—first flexible filler; 6b—second flexible filler; 6c—third flexible filler; 7—sub-bag; 8—air guide channel; 9—vehicle seat; 10—seat foam; 11—seat cover; 12—inflatable bag reserving groove; 13—covering layer; 14—heating pad; 15—connecting tube; 16—seat cushion; 17—backrest; 18—fan; 19—air ventilation pipe; 20—air guide pocket; 21—manual switch; 22—overflow valve; 23—height limiting structure; 23—1—penetrating-type height limiting strap; 23—2—built-in height limiting strap; 24—main air pipe; 25—third air path; 26—human body; 200—external air source.

DETAILED DESCRIPTION OF THE EMBODIMENTS

The present invention will be described in further detail below with reference to the accompanying drawings and embodiments. It will be understood that specific embodiments described here are only intended to explain a relevant invention, but not intended to limit the invention. In addition, it should be noted that only the parts related to the invention are shown in the drawings for ease of description.

It should be noted that similar reference numerals and letters refer to similar items in the following figures, and thus once an item is defined in one figure, it may not be further defined or explained in the following figures.

In the description of the present disclosure, it should be noted that the terms such as "center", "up", "down", "left", "right", "vertical", "horizontal", "inside", and "outside", if present, indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In addition, the terms such as "first", "second", and "third", if present, are used for distinguishing the description only, and should not be understood as an indication or implication of relative importance.

In addition, the term "horizontal", "vertical", "overhanging", or the like, if present, means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that the terms such as "arranged", "mounted", "coupled", and "connected", if present, should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the embodiments in the present disclosure and the features in the embodiments can be combined with each other without conflict. The present disclosure will be described below in detail with reference to the accompanying drawings and in connection with embodiments.

Referring to FIG. 1, FIG. 1 is a schematic structural diagram of a first softness adjusting device 100 for a vehicle seat according to this embodiment. The device is configured to be arranged under a seat cover 11 (shown in FIG. 9) of a vehicle seat 9 (shown in FIG. 9). The device includes a soft inflatable bag 1 and a valve component 40 arranged outside the soft inflatable bag 1. The valve component 40 includes a throttle valve 4 and a one-way check valve 5. The throttle valve 4 is configured to block or communicate a gas in the soft inflatable bag 1 from or with an external air source 200. The one-way check valve 5 provides a flow direction from outside to inside and is configured to fill the soft inflatable bag 1 with the external air source 200 when the pressure of the external air source 200 is greater than air pressure in a cavity 101 of the soft inflatable bag 1. The soft inflatable bag 1 is filled with at least one flexible filler 6.

With reference to FIG. 1, the one-way check valve 5 may be simply referred to as a one-way valve, which allows a gas to flow in a single direction. In other words, the single flow direction is shown by the direction of an arrow under the one-way check valve 5 in FIG. 1. In other words, the external air source 200 can enter the cavity 101 of the soft inflatable bag 1 through the one-way check valve 5, while the gas in the cavity 101 of the soft inflatable bag 1 cannot flow outward through the one-way check valve 5. In other words, the phrase "from outside to inside" herein refers to a direction from the outside of the soft inflatable bag 1 to the inside of the cavity 101 of the soft inflatable bag 1.

In this embodiment, the flexible filler 6 is at least one of sponge, aerosol, a three-dimensional woven fabric, a rubber elastic structure, and a fiber cushion layer. In other words, the flexible filler 6 may be sponge, aerosol, a three-dimensional woven fabric, a rubber elastic structure, or a fiber cushion layer, or a combination of two or three or five thereof. The flexible filler 6 has elasticity and can be restored to its original shape to provide support for the soft inflatable bag 1 after it is decompressed.

Here, the throttle valve 4 and the one-way check valve 5 in the valve component 40 may optionally be specifically arranged in the following manners:

1. As shown in FIG. 1, a first air path 2 and a second air path 3 are arranged outside the soft inflatable bag 1, respectively. The first air path 2 and the second air path 3 lead to the cavity 101 of the soft inflatable bag 1. The throttle valve 4 is mounted in the first air path 2. The one-way check valve 5 is mounted in the second air path 3.

Figure 2:
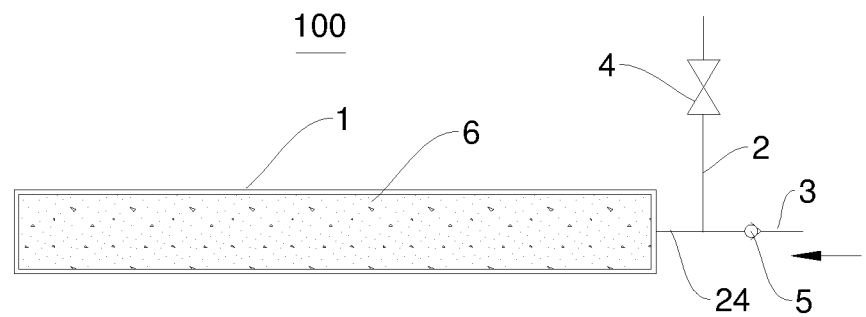
FIG. 2 is a schematic diagram of a second softness adjusting device for a vehicle seat according to an embodiment of the present disclosure.

2. As shown in FIG. 2, a main air pipe 24 is arranged from the outer side of the soft inflatable bag 1. The throttle valve 4 is mounted in a first air path 2. The one-way check valve 5 is mounted in a second air path 3. The first air path 2 and the second air path 3 are arranged in parallel and each have one end connected to the end portion of the main air pipe 24.

Here, the following two types of valves may optionally be used and function as the throttle valve 4:

1. A pure on-off valve having only the opening and closing functions may be used. For example, a manual valve switch of the BUC/BUL series from JEND Pneumatics may be used.

Figure 3:
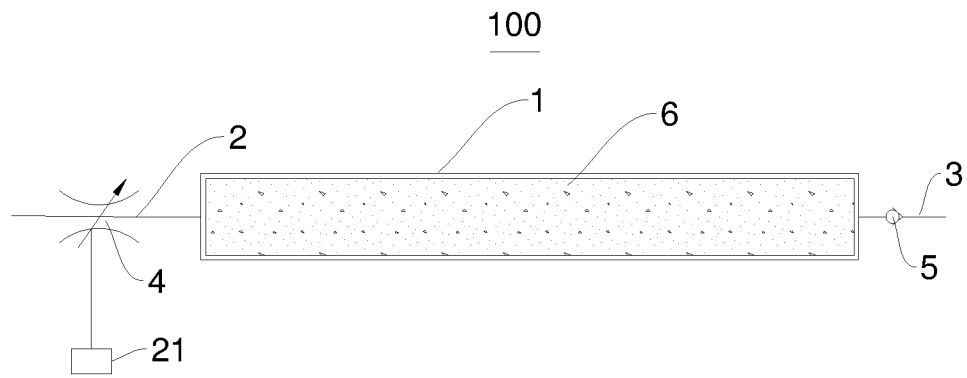
FIG. 3 is a schematic diagram of a third softness adjusting device for a vehicle seat according to an embodiment of the present disclosure.

2. As shown in FIG. 3, the throttle valve 4 may be an on-off valve with a flow adjustment function. The valve has the function of controlling the gas feed and discharge speeds. In this case, the speed of feeding or discharging of a gas to or from the soft inflatable bag 1 can be adjusted by the throttle valve 4. For example, a pneumatic quickly-insertable manual valve made of 304 stainless steel by Jinhan, i.e., a SA series throttle valve having two quickly-insertable ends for manually adjusting a flow rate of an air source, may be used.

Here, an electronic control valve may also be used as the throttle valve 4. An input module and a controller are arranged corresponding to the electronic control valve. When an occupant (passenger or driver) inputs a signal requiring the soft state by means of the input module, the controller controls the electronic control valve to open. When the occupant inputs a signal requiring the hard state by means of the input module, the controller controls the electronic control valve to close.

Here, in this embodiment, the throttle valve 4 is a manual valve. The manual valve is connected with a manual switch 21 configured to energize and deenergize the manual valve. In other embodiments, a solenoid valve may optionally be used as the throttle valve 4.

Optionally, the throttle valve 4 and the one-way check valve 5 may be arranged integrally in order to save space.

The throttle valve 4 with pure opening and closing functions is described as an example. It has two operating positions, namely, open and closed positions. Correspondingly, the softness adjusting device 100 for a vehicle seat in this embodiment has the following operating states:

1. First State (Soft State): the throttle valve 4 is in the open state, where airflow can flow.

a. In a natural state, air pressure in the cavity 101 of the soft inflatable bag 1 is substantially the same as the external atmospheric pressure. In other words, the internal and external air pressures are balanced, there is no gas flow or exchange (in a stationary state), and the flexible filler 6 is in a naturally swelling state.

b. When the vehicle seat is occupied by a human body, that is, when an occupant is sitting in the vehicle seat, the seat surface of the vehicle seat is squeezed by force, and the seat surface and the soft inflatable bag 1 therein are pressed by the weight of the human body. The flexible filler 6 in the soft inflatable bag 1 is compressed, air in the cavity 101 of the soft inflatable bag 1 is discharged to the outside of the soft inflatable bag 1 through the opened throttle valve 4, and the soft inflatable bag 1 collapses and flattens. At this time, the seat surface exhibits a relatively soft state.

c. When the human body leaves the seat surface, and the seat surface is restored to the unstressed state, i.e., the state where no one is sitting thereon, the enclosed soft inflatable bag 1 is filled with the swelling inner flexible filler 6, and the soft inflatable bag 1 is gradually restored in height. At this time, air flows back to the inside of the soft inflatable bag 1 from the opened throttle valve 4 under the influence of the difference between internal and external pressures until the internal and external air pressures are fully balanced. The seat surface is also restored to a flat state.

2. Second State (Harder State): the throttle valve 4 is in the closed state where there is no air flow.

a. In a natural state, air pressure in the cavity 101 of the soft inflatable bag 1 is substantially the same as the external atmospheric pressure. In other words, the internal and external air pressures are balanced, and there is no gas flow or exchange.

b. When the vehicle seat is occupied by a human body, that is, when an occupant is sitting in the vehicle seat, the seat surface of the vehicle seat is squeezed by force, and the seat surface and the soft inflatable bag 1 therein are pressed by the weight of the human body. The flexible filler 6 in the soft inflatable bag 1 is compressed. Since the throttle valve 4 is closed and the one-way check valve 5 provides a flow direction from outside to inside, air cannot be discharged from the inside of the soft inflatable bag 1. At this time, the air pressure inside the soft inflatable bag 1 is increased due to the seat surface squeezed by force, so that the soft inflatable bag 1 will not completely collapse or flatten and exhibits certain supporting capability. At this time, the seat surface exhibits a relatively hard state.

3. Third State (Transition State): the throttle valve 4 is closed when a person is sitting in the seat in the first state (soft state).

a. When the vehicle seat is occupied by a human body, that is, when an occupant is sitting in the vehicle seat, the seat surface of the vehicle seat is squeezed by force, and the seat surface and the soft inflatable bag 1 therein are pressed by the weight of the human body. The flexible filler 6 in the soft inflatable bag 1 is compressed, air inside the soft inflatable bag 1 is discharged to the outside of the soft inflatable bag 1 through the throttle valve 4, and the soft inflatable bag 1 collapses and flattens.

b. At this time, the throttle valve 4 is closed, and the human body leaves the seat surface. The enclosed soft inflatable bag 1 presents a more significant negative pressure state relative to the outside. The soft inflatable bag 1 which is filled with the swelling inner flexible filler 6 is gradually restored in height. At this time, air flows back to the inside of the soft inflatable bag 1 from the opened one-way check valve 5 under the influence of the difference between internal and external pressures until the internal and external air pressures are fully balanced.

The soft inflatable bag 1 may optionally be implemented in the following manners:

1. A single soft inflatable bag 1 is used, as shown in FIGS. 1 to 3.

Figure 4:
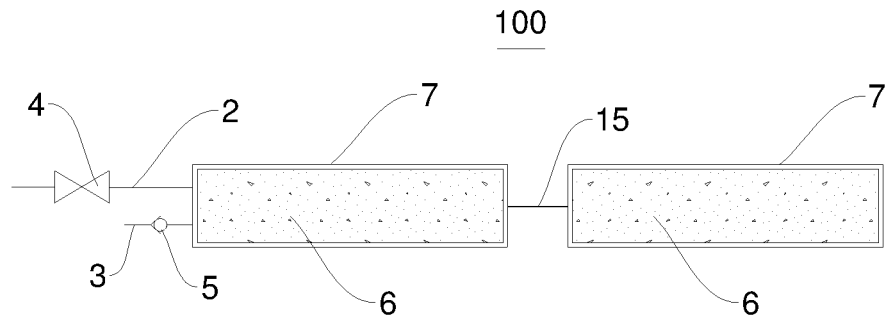
FIG. 4 is a schematic diagram of a fourth softness adjusting device for a vehicle seat according to an embodiment of the present disclosure.

2. As shown in FIG. 4, the soft inflatable bag 1 is composed of two sub-bags 7 with air paths communicating with each other, and the sub-bags 7 communicate with each other via a connecting tube 15. Both the first air path 2 and the second air path 3 may be arranged on one of the sub-bags 7. Specifically, both the first air path 2 and the second air path 3 are connected to one end of one of the sub-bags 7, and the other end of the sub-bag 7 communicates with the other sub-bag 7 via the connecting tube 15. The first air path 2 and the second air path 3 may also be arranged on the two sub-bags 7, respectively. Specifically, the first air path 2 and the second air path 3 are connected to two ends of the two sub-bags 7, respectively, and the other ends of the two sub-bags 7 communicate with each other via the connecting tube 15. Alternatively, each sub-bag 7 is provided with a first air path 2 and a second air path 3, and the two sub-bags 7 communicate with each other via the connecting tube 15.

Figure 5:
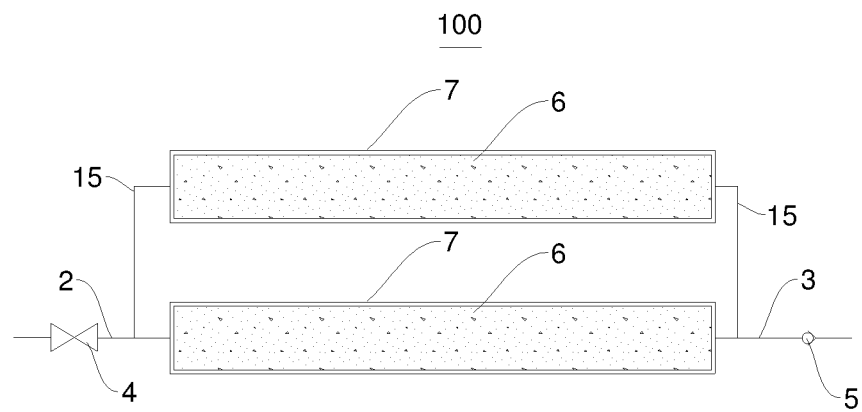
FIG. 5 is a schematic diagram of a fifth softness adjusting device for a vehicle seat according to an embodiment of the present disclosure.

3. As shown in FIG. 5, the soft inflatable bag 1 is composed of two sub-bags 7 with air paths communicating with each other. Specifically, the first air path 2 and the second air path 3 are connected to the two ends of one of the two sub-bags 7, respectively, and the two ends of the other sub-bag 7 are connected in parallel and communicate with the two ends of the one sub-bag body 7 via two connecting tubes 15, respectively.

Of course, in other embodiments, there may be three, four, or more sub-bags 7.

In this embodiment, the soft inflatable bag 1 has a thickness of 3 cm. In other embodiments, the soft inflatable bag 1 has a thickness ranging from 1 cm to 5 cm. Specifically, the thickness may be 1 cm, 2 cm, 4 cm, or 5 cm, for example.

Therefore, in the technical solution according to this embodiment, the user can select the softness or hardness of the seat by means of the one-way check valve 5 or by merely manually adjusting or controlling the open or closed state of the throttle valve 4, which is convenient in use and low in cost.

Figure 6:
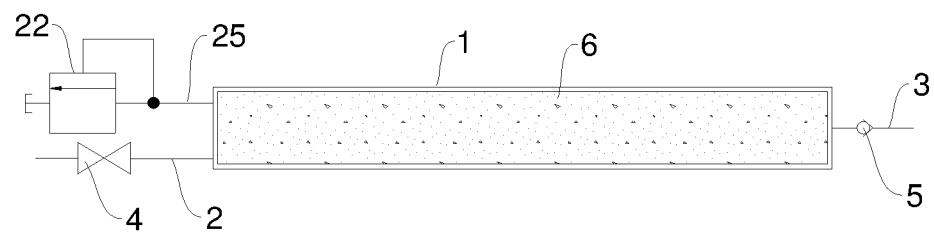
FIG. 6 is a schematic diagram of a sixth softness adjusting device for a vehicle seat according to an embodiment of the present disclosure.

The softness adjusting device 100 for a vehicle seat according to this embodiment may also have the function of adjusting the air pressure in the soft inflatable bag 1. As shown in FIG. 6, the valve component 40 further includes an overflow (or relief) valve 22. The overflow valve 22 is configured to discharge the gas from the soft inflatable bag so that the pressure in the soft inflatable bag 1 is reduced to a set pressure when the pressure in the soft inflatable bag 1 is greater than or equal to the set pressure. Here, the set pressure is determined by the overflow pressure of the overflow valve 22. In designing, the overflow valve 22 conforming to the overflow pressure is selected according to the required pressure. For example, a spring-type safety valve of model A28X-16T manufactured by Harada may be used as the overflow valve 22.

The overflow valve 22 is added to prevent bulging of the edge of the soft inflatable bag 1 caused by pressing of the airflow in the center of the soft inflatable bag 1 to the edge of the soft inflatable bag 1 due to collapse of a region at higher pressure when the soft inflatable bag 1 is squeezed by a human body who is sitting in the seat in the case where the throttle valve 4 is closed, which would affect the appearance of the seat and reduce the comfort in sitting in the seat. When the overflow valve 22 is used, a pressure value at moderate hardness is regarded as the overflow pressure value, or the overflow pressure value corresponds to a certain set hardness value of the seat. It can be ensured by the overflow valve 22 that the pressure in the seat does not exceed the set value. When the pressure exceeds the overflow pressure value, a part of the gas is discharged through the overflow valve 22 to ensure a constant pressure value in the soft inflatable bag 1 so that its softness or hardness remains constant, and a protruding or bulging shape of a particular portion is avoided.

Figure 7:
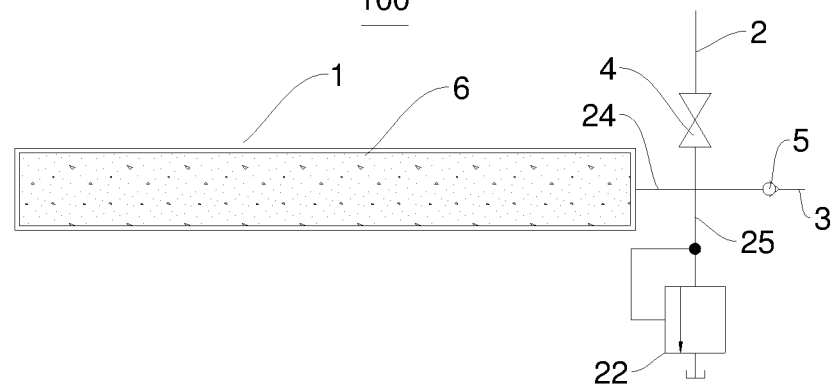
FIG. 7 is a schematic diagram of a seventh softness adjusting device for a vehicle seat according to an embodiment of the present disclosure.

Here, the overflow valve 22 may be mounted in a manner as shown in FIG. 6, in which a third air path 25 is separately arranged from the outer side of the soft inflatable bag 1 (on the basis of FIG. 1), and the overflow valve 22 is mounted in the third air path 25. Alternatively, the overflow valve 22 may be mounted in a manner as shown in FIG. 7, in which the third air path 25 is connected to the main air pipe 24 (on the basis of FIG. 2) and is arranged in parallel with the first air path 2 and the second air path 3.

Here, the overflow valve 22 may also be arranged integrally with the throttle valve 4 and/or the one-way check valve 5.

Figure 8:
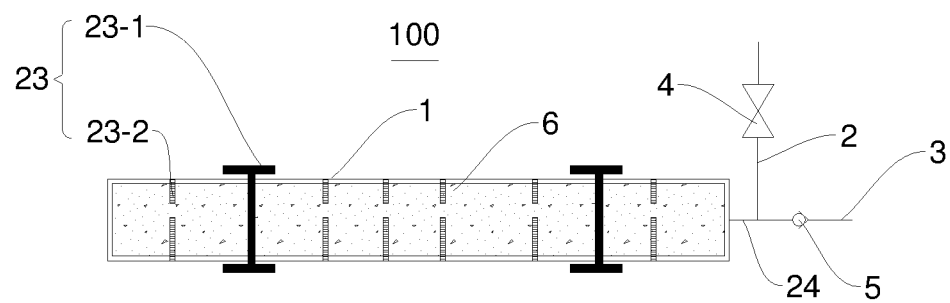
FIG. 8 is a schematic diagram of an eighth softness adjusting device for a vehicle seat according to an embodiment of the present disclosure.

In other embodiments, as shown in FIG. 8, a height limiting structure 23 configured to limit the expansion height of the soft inflatable bag 1 when it is squeezed may also be arranged in the soft inflatable bag 1, thereby avoiding partial collapse of a partial region of the soft inflatable bag 1 due to high pressure.

The height limiting structure 23 includes penetrating-type height limiting straps 23-1 and/or built-in height limiting straps 23-2 arranged in a distributed manner. The cross sections of the penetrating-type height limiting strap 23-1 and the built-in height limiting strap 23-2 may be in a variety of shapes such as a dot shape, a strip shape, a circular shape, or a honeycomb shape.

The height limiting structure is made of a flexible material that may be selected from a polyester film, a braided strap, woven fabric, a non-woven material, a soft plastic breathable film, a perforated plastic sheet, or the like.

The penetrating-type height limiting strap 23-1 has an I-shaped vertical section. It has two ends protruding beyond the soft inflatable bag 1, and has a vertical portion located in the soft inflatable bag 1 and slightly longer than the normal height of the soft inflatable bag 1 when deflated. When the soft inflatable bag 1 is being inflated, its ends protruding beyond the soft inflatable bag 1 can exert pressure on the surface of the soft inflatable bag 1 to avoid excessive expansion of the soft inflatable bag at a single point.

Since the penetrating-type height limiting strap 23-1 penetrates through the soft inflatable bag 1, sealing rings are arranged or sealants are applied between the ends thereof protruding beyond the soft inflatable bag 1 and adjacent surfaces of the soft inflatable bag 1, or the ends are welded to the soft inflatable bag 1 to prevent escape of the gas from the penetrated portions, in order to ensure the airtightness of the penetrated portions during inflation.

The two ends of the built-in height limiting strap 23-2 are fixed to the upper and lower inner surfaces of the soft inflatable bag 1, respectively, and are fixed between the isolation layer of the soft inflatable bag 1 and the upper and lower inner surfaces of the soft inflatable bag 1, respectively. The two ends of the built-in height limiting strap 23-2 may be optionally fixed in the soft inflatable bag 1 by means of: ultrasonic welding, gluing, riveting, threading connection, or the like.

In any way described above, the built-in height limiting strap 23-2 limits the height of swelling of the soft inflatable bag 1 at this position by tightening the upper and lower portions in the soft inflatable bag 1.

In an optional embodiment, openings are provided in the middle of the penetrating-type height limiting strap 23-1 and the built-in height limiting strap 23-2 and configured to conduct the airflow on both sides thereof.

The height limiting structure 23 may consist of the penetrating-type height limiting straps 23-1 or the built-in height limiting straps 23-2 alone, or consist of both the penetrating-type height limiting straps 23-1 and the built-in height limiting straps 23-2. With reference to FIG. 8, the same soft inflatable bag 1 is provided with multiple penetrating-type height limiting straps 23-1 and multiple built-in height limiting straps 23-2. In specific implementation, only one type of height limiting strap may be used, or the two types of height limiting straps may be combined. The number and type of height limiting straps provided for the same soft inflatable bag 1 are not limited.

Figure 9:
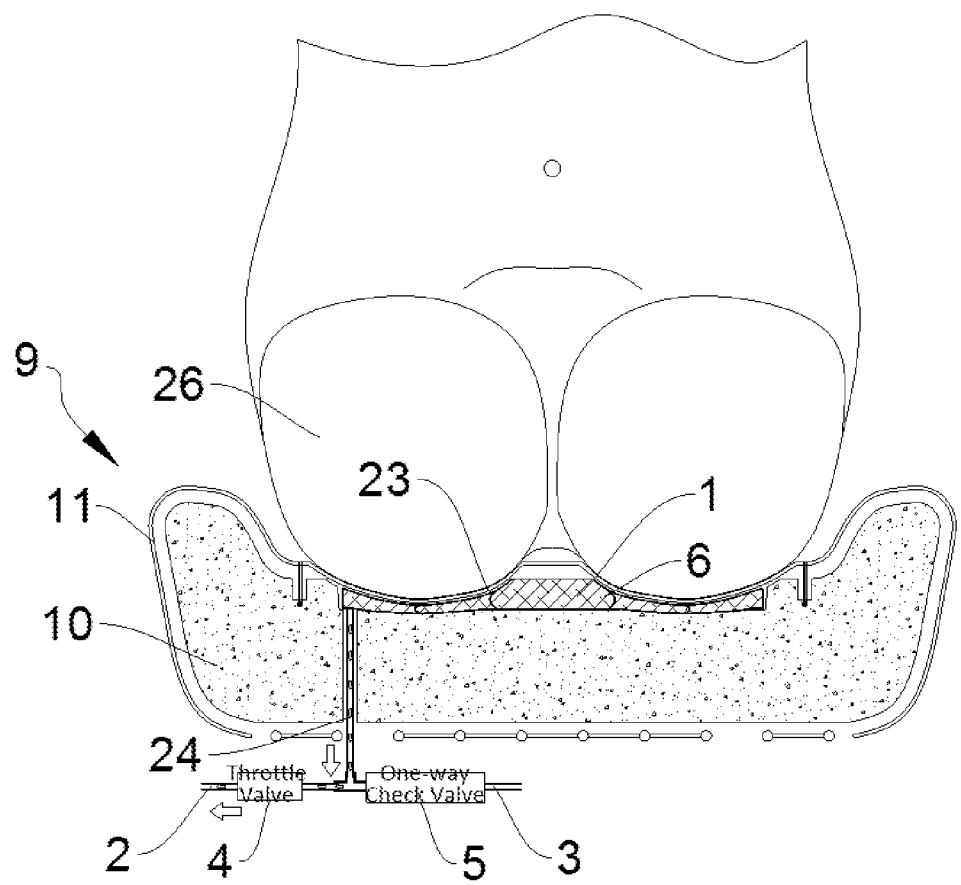
FIG. 9 is a schematic diagram of the eighth softness adjusting device for a vehicle seat in a first state according to an embodiment of the present disclosure.
Figure 10:
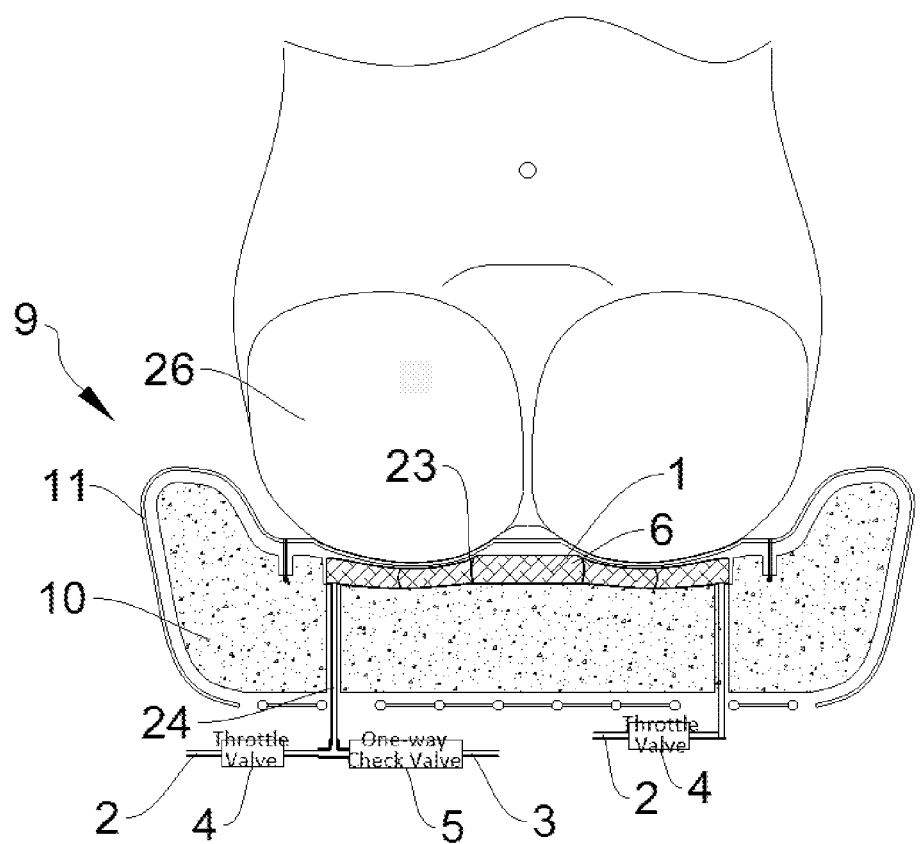
FIG. 10 is a schematic diagram of the eighth softness adjusting device for a vehicle seat in a second state according to an embodiment of the present disclosure.
Figure 11:
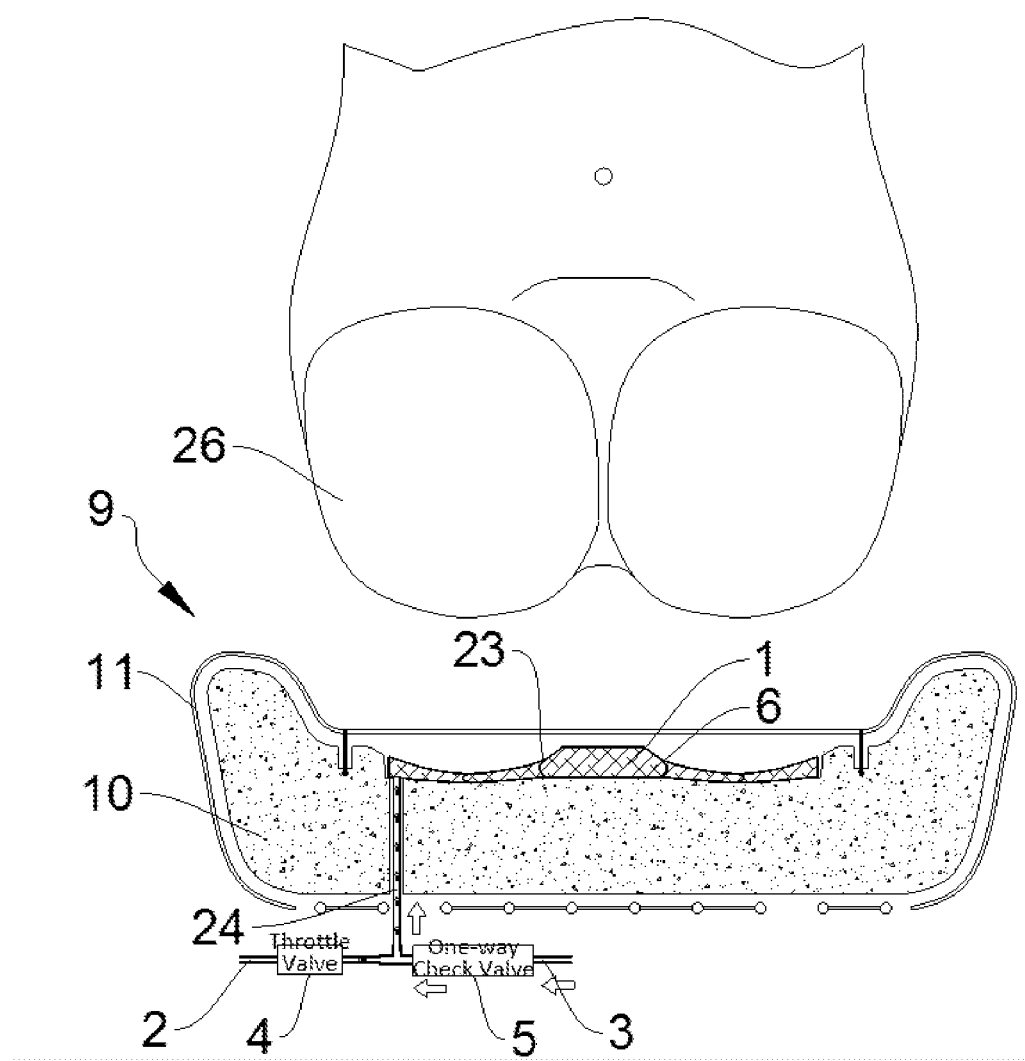
FIG. 11 is a schematic diagram of the eighth softness adjusting device for a vehicle seat in a third state according to an embodiment of the present disclosure.

As shown in FIGS. 9 to 11, when the soft inflatable bag 1 is provided with the height limiting structure 23, the soft inflatable bag 1 has the following changes in each state:

In the first state (soft state), as shown in FIG. 9, when a human body 26 is sitting on the seat surface and the soft inflatable bag 1 is in an unfilled state, the height limiting structure 23 bends and collapses. The soft inflatable bag 1 and the flexible filler 6 therein are compressed, and the gas flows out through the throttle valve 4 in the "open state", so that the surface of the seat is in a relatively soft state, and the torso of the human body 26 sinks deeper into the seat surface. Specifically, a seat foam 10 is arranged inside the seat cover 11 of the vehicle seat 9, and a soft inflatable bag 1 is arranged at a position above the seat foam 10. The soft inflatable bag 1 has a flexible filler 6 therein and is also provided with a height limiting structure 23. The main air pipe 24 has one end extending in the seat foam 10 and communicating with the soft inflatable bag 1, and the other end extending out of the seat cover 11 and communicating with both one end of the first air path 2 and one end of the second air path 3. A throttle valve 4 is mounted in the first air path 2, and a one-way check valve 5 is mounted in the second air path 3. The upper surface of the seat cover 11 is the seat surface, and may also be referred to as the surface of the seat.

In the second state (harder state), as shown in FIG. 10, when the human body 26 is sitting on the seat surface and the soft inflatable bag 1 is in an unfilled state, the height limiting structure 23 bends and collapses. The soft inflatable bag 1 and the flexible filler 6 therein are compressed. At this time, the throttle valve 4 is in the "closed state" and the air path is obstructed, and the one-way check valve 5 is not conductive. The soft inflatable bag 1 is compressed and deformed, resulting in a decrease in space and an increase in pressure inside its cavity 101, so that the surface of the seat is in a hard state, and the torso of the human body 26 sinks shallowly into the seat surface. During transition from the hard state to the soft state, the throttle valve 4 is opened, the gas is discharged from the throttle valve 4 into the air, and the seat surface becomes a soft state. Compared with the structure shown in FIG. 9, in FIG. 10, another first air path 2 is additionally arranged at the right end of the soft inflatable bag 1, and this first air path 2 is also equipped with a throttle valve 4.

In the third state (transition state), as shown in FIG. 11, when the human body 26 leaves the seat surface from the sitting state, the pressure disappears, and the seat is restored to the state where no one is sitting therein. The squeezing pressure exerted on the soft inflatable bag 1 by the human body 26 disappears. The flexible filler 6 in the soft inflatable bag 1 is restored to the uncompressed state, resulting in an increase in space and a decrease in space inside the soft inflatable bag 1. When the throttle valve 4 is in the closed state, the atmospheric pressure at one end of the one-way check valve 5 is greater than the pressure in the soft inflatable bag 1, thus air enters the soft inflatable bag 1 in the direction of the arrow. The air in the soft inflatable bag 1 increases until the pressure in the soft inflatable bag 1 is equal to the atmospheric air pressure at the other end of the one-way check valve 5. When the human body is seated again, the air paths of the throttle valve 4 and the one-way check valve 5 are obstructed. This is the harder state mentioned above.

Figure 12:
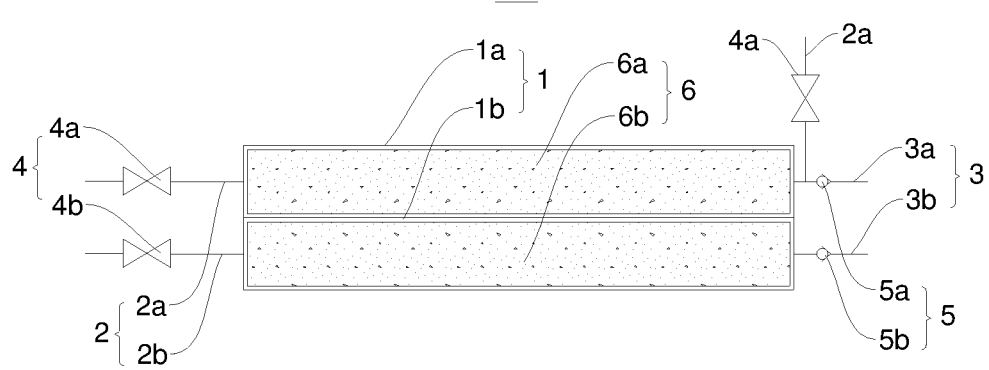
FIG. 12 is a schematic diagram of a ninth softness adjusting device for a vehicle seat according to an embodiment of the present disclosure.

In this embodiment, a plurality of soft inflatable bags 1 may be arranged in a stacked manner to enable multi-level adjustment of softness. As shown in FIG. 12, a first soft inflatable bag 1*a* and a second soft inflatable bag 1*b* arranged in two stacked layers and arranged in upper and lower stacked layers are described as an example. In this case, the softness adjusting device 100 for a vehicle seat enables the adjustment of softness in the following states:

1. First State (Softest State): the first soft inflatable bag 1*a* and the first throttle valve 4*a* are in an open state where airflow can flow. The second soft inflatable bag 1*b* and the second throttle valve 4*b* are in an open state where airflow can flow.

a. In a natural state, air pressure inside the first soft inflatable bag 1*a* and the second soft inflatable bag 1*b* is substantially the same as the external atmospheric pressure. In other words, the internal and external air pressures are balanced, and there is no gas flow or exchange (in a stationary state).

b. When the vehicle seat is occupied by a human body, that is, when an occupant is sitting in the vehicle seat, the seat surface of the vehicle seat is squeezed by force, and the seat surface and the first soft inflatable bag 1*a* and the second soft inflatable bag 1*b* therein are pressed by the weight of the human body. The first flexible filler 6*a* and the second flexible filler 6*b* in the first soft inflatable bag 1*a* and the second soft inflatable bag 1*b* are compressed, so that air inside the first soft inflatable bag 1*a* is discharged to the outside of the bag body through the first throttle valve 4, air inside the second soft inflatable bag 1*b* is discharged to the outside of the second soft inflatable bag 1*b* through the second throttle valve 4*b*, and the first soft inflatable bag 1*a* and the second soft inflatable bag 1*b* collapse and flatten. The seat surface exhibits the softest state.

c. When the human body leaves the seat surface, and the seat surface is restored to the unstressed state, i.e., the state where no one is sitting thereon, the enclosed first soft inflatable bag 1*a* and second soft inflatable bag 1*b* are filled with the swelling first flexible filler 6*a* and second flexible filler 6*b*, respectively, and the first soft inflatable bag 1*a* and the second soft inflatable bag 1*b* are gradually restored in height. At this time, air flows back to the inside of the first soft inflatable bag 1*a* and the second soft inflatable bag 1*b* from the opened first throttle valve 4*a* and second throttle valve 4*b* under the influence of the difference between internal and external pressures, respectively, until the internal and external air pressures are fully balanced.

2. Second State (Softer State/First Adjusted Soft State): the first soft inflatable bag 1*a* and the first throttle valve 4*a* are in the open state where airflow can flow. The second soft inflatable bag 1*b* and the second throttle valve 4*b* are in the closed state where there is no air flow.

a. In a natural state, air pressure inside the first soft inflatable bag 1*a* and the second soft inflatable bag 1*b* is substantially the same as the external atmospheric pressure. In other words, the internal and external air pressures are balanced, and there is no gas flow or exchange.

b. In the state where the seat surface is occupied by a human body and is squeezed by force (an occupant is seated), the seat surface and the first soft inflatable bag 1*a* and the second soft inflatable bag 1*b* therein are pressed by the weight of the human body.

At this time, the first flexible filler 6*a* in the first soft inflatable bag 1*a* is compressed, air inside the first soft inflatable bag 1*a* is discharged to the outside of the bag body through the first throttle valve 4*a*, and the first soft inflatable bag 1*a* collapses and flattens.

At this time, the second flexible filler 6*b* in the second soft inflatable bag 1*b* is compressed, and air cannot be discharged from the inside of the first inflatable bag 1*b* (at this time, the second throttle valve 4*b* has been closed, and air cannot be discharged to the outside through the second one-way check valve 5*b*). At this time, the second soft inflatable bag 1*b*, which is filled with internal air, will not completely collapse or flatten and exhibits certain supporting capability.

In this case, the first soft inflatable bag 1*a* in the upper layer exhibits a soft characteristic, the second soft inflatable bag 1*b* in the lower layer exhibits a hard characteristic, and the seat surface is relatively soft and is not the softest. The torso of the human body on the seat surface compresses only the first soft inflatable bag 1*a* in the upper layer, while the lower second soft inflatable bag 1*b* is in a support state as an air cushion.

3. Third State (Softer State/Second Adjusted Soft State): the first soft inflatable bag 1*a* and the first throttle valve 4*a* are in the closed state, where there is no air flow. The second soft inflatable bag 1*b* and the second throttle valve 4*b* are in the open state, where airflow can flow.

a. In a natural state, air pressure inside the first soft inflatable bag 1*a* and the second soft inflatable bag 1*b* is substantially the same as the external atmospheric pressure.

In other words, the internal and external air pressures are balanced, and there is no gas flow or exchange.

b. In the state where the seat surface is occupied by a human body and is squeezed by force (an occupant is seated), the seat surface and the first soft inflatable bag 1a and the second soft inflatable bag 1b therein are pressed by the weight of the human body.

At this time, the first flexible filler 6a and the second flexible filler 6b in the first soft inflatable bag 1a and the second soft inflatable bag 1b are compressed, and air cannot be discharged from the inside of the first inflatable bag 1a (at this time, the first throttle valve 4a has been closed, and air cannot be discharged to the outside through the first one-way check valve 5a). At this time, the first soft inflatable bag 1a, which is filled with internal air, will not completely collapse or flatten and exhibits certain supporting capability.

At this time, the second flexible filler 6b in the second soft inflatable bag 1b is compressed, air inside the second soft inflatable bag 1b is discharged to the outside of the bag body through the second throttle valve 4b, and the second soft inflatable bag 1b collapses and flattens.

In this case, the first soft inflatable bag 1a in the upper layer exhibits a hard characteristic, the second soft inflatable bag 1b in the lower layer exhibits a soft characteristic, and the seat surface is relatively soft and is still not the softest. The first soft inflatable bag 1a in the upper layer adjacent to the torso of the human body on the seat surface is in a support state as an air cushion, while the lower second soft inflatable bag 1b is in a pressed and compressed state.

4. Fourth State (Hardest State): the first soft inflatable bag 1a and the first throttle valve 4a are in the closed state, where there is no air flow. The second soft inflatable bag 1b and the second throttle valve 4b are in the closed state, where there is no air flow.

a. In the state where the seat surface is occupied by a human body and is squeezed by force (an occupant is seated), the seat surface and the first soft inflatable bag 1a and the second soft inflatable bag 1b therein are pressed by the weight of the human body. The first flexible filler 6a and the second flexible filler 6b in the first soft inflatable bag 1a and the second soft inflatable bag 1b are compressed, and air inside the first soft inflatable bag 1a and the second soft inflatable bag 1b are discharged to the outside of the bag bodies through the first flexible filler 6a and the second flexible filler 6b, so that the bag bodies collapse and flatten.

b. In the state where the seat surface is occupied by a human body and is squeezed by force (an occupant is seated), the seat surface and the first soft inflatable bag 1a and the second soft inflatable bag 1b therein are pressed by the weight of the human body.

At this time, the first flexible filler 6a in the first soft inflatable bag 1a is compressed, and air cannot be discharged from the inside of the first inflatable bag 1a (at this time, the first throttle valve 4a has been closed, and air cannot be discharged to the outside through the first one-way check valve 5a). At this time, the first soft inflatable bag 1a, which is filled with internal air, will not completely collapse or flatten and exhibits certain supporting capability.

At this time, the second flexible filler 6b in the second soft inflatable bag 1b is compressed, and air cannot be discharged from the inside of the second inflatable bag 1b (at this time, the second throttle valve 4b has been closed, and air cannot be discharged to the outside through the second one-way check valve 5b). At this time, the second soft inflatable bag 1b, which is filled with internal air, will not completely collapse or flatten and exhibits certain supporting capability.

In this case, the first soft inflatable bag 1a in the upper layer exhibits a hard characteristic, the second soft inflatable bag 1b in the lower layer also exhibits a hard characteristic, and the seat surface exhibits the hardest state. The first soft inflatable bag 1a in the upper layer adjacent to the torso of the human body on the seat surface is in a support state as an air cushion, and the lower second soft inflatable bag 1b is also in a support state as an air cushion.

5. Fifth State (Transition State): a. When a human body is sitting in the seat, the first throttle valve 4a and the second throttle valve 4b are switched from the original open state to the closed state. The human body leaves the seat surface. The enclosed first soft inflatable bag 1a and second soft inflatable bag 1b present a more significant negative pressure state relative to the outside. The first soft inflatable bag 1a and the second soft inflatable bag 1b are filled with the swelling inner flexible fillers 6 and are gradually restored in height. At this time, air flows back to the inside of the first soft inflatable bag 1a and the second soft inflatable bag 1b from the opened first one-way check valve 5a and second one-way check valve 5b under the influence of the difference between internal and external pressures until the internal and external air pressures are fully balanced. The first soft inflatable bag 1a and the second soft inflatable bag 1b are restored to the normal flat and straightened state.

It can be understood, with reference to FIG. 12 and the above description, that the soft inflatable bag 1 includes a first soft inflatable bag 1a and a second soft inflatable bag 1b, the first air path 2 includes a first air sub-path 2a and a second air sub-path 2b, the second air path 3 includes a third air sub-path 3a and a fourth air sub-path 3b, the throttle valve 4 includes a first throttle valve 4a and a second throttle valve 4b, the one-way check valve 5 includes a first one-way check valve 5a and a second one-way check valve 5b, and the flexible filler 6 includes a first flexible filler 6a and a second flexible filler 6b.

Figure 13:
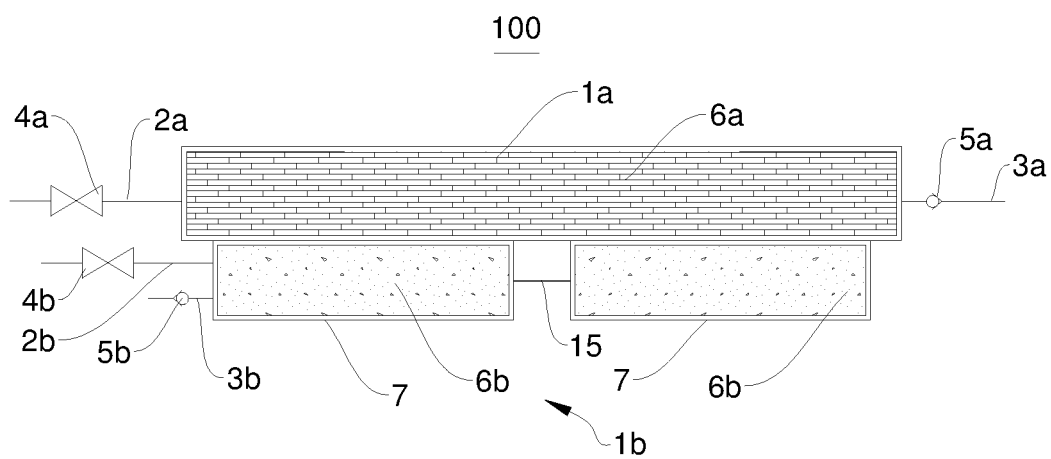
FIG. 13 is a schematic diagram of a tenth softness adjusting device for a vehicle seat according to an embodiment of the present disclosure.

The stacked soft inflatable bags 1 may optionally be stacked in the following manners:

1. As shown in FIG. 13, the second soft inflatable bag 1b is implemented by using the structure as shown in FIG. 4, namely, using two sub-bags 7. Specifically, reference may be made to the above description of FIG. 4. In FIG. 13, the second throttle valve 4b and the second one-way check valve 5b simultaneously control the two sub-bags 7.

Figure 14:
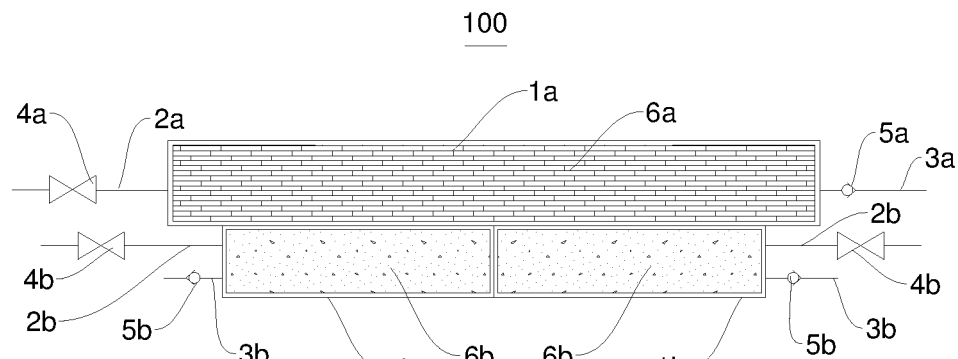
FIG. 14 is a schematic diagram of an eleventh softness adjusting device for a vehicle seat according to an embodiment of the present disclosure.
Figure 15:
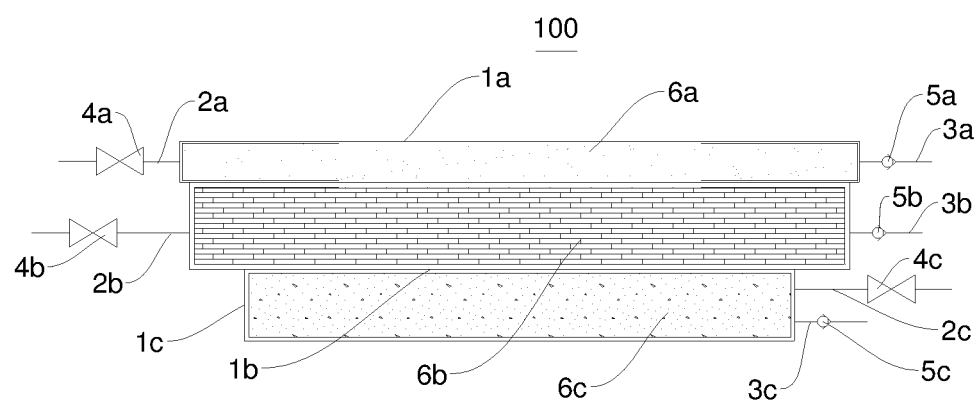
FIG. 15 is a schematic diagram of a twelfth softness adjusting device for a vehicle seat according to an embodiment of the present disclosure.

2. As shown in FIG. 14, two second soft inflatable bags 1b are used and located side by side under the first soft inflatable bag 1a. The soft or hard states of the two second soft inflatable bags 1b can be adjusted separately and independently, therefore difference softness or hardness can be achieved for the left half part and the right half part. In FIG. 14, two second throttle valves 4b and two second one-way check valves 5b control the two second soft inflatable bags 1b separately and independently. 3. As shown in FIG. 15, three layers of soft inflatable bags 1 are used. In other words, a third soft inflatable bag 1c is further arranged under the second soft inflatable bag 1b, and the third soft inflatable bag 1c is filled with a third flexible filler 6c. Correspondingly, the third soft inflatable bag 1c is provided with a fifth air sub-path 2c and a sixth air sub-path 3c. A third throttle valve 4c is connected to the fifth air sub-path 2c. A third one-way check valve 5c is connected to the six air sub-path 3c. More levels of softness or hardness states can be achieved by different arrangements and combinations of the softness or hardness of the three layers of soft inflatable bags 1. In FIG. 15, the first soft inflatable bag 1a is independently controlled by the first throttle valve 4a and the first one-way check valve 5a. The second soft inflatable bag 1*b* is independently controlled by the second throttle valve 4*b* and the second one-way check valve 5*b*. The third soft inflatable bag 1*c* is independently controlled by the third throttle valve 4*c* and the third one-way check valve 5*c*.

Figure 16:
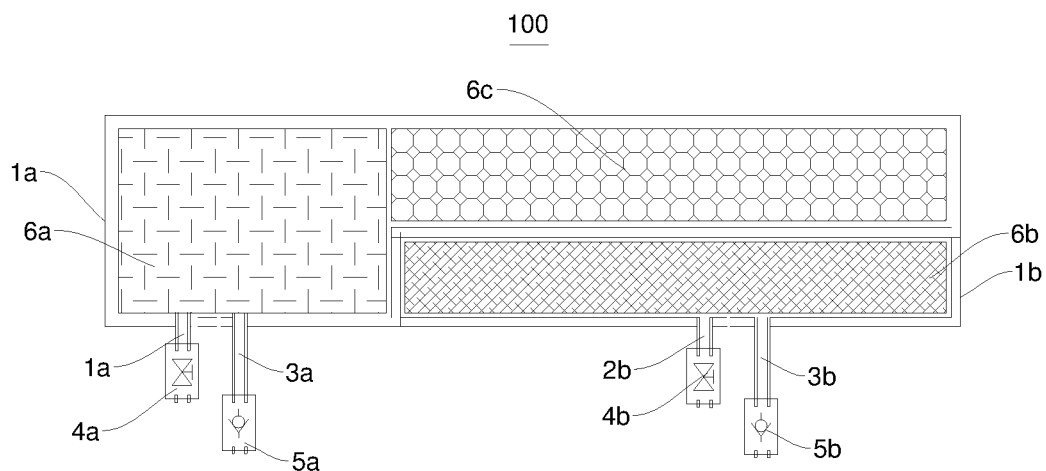
FIG. 16 is a schematic diagram of a thirteenth softness adjusting device for a vehicle seat according to an embodiment of the present disclosure.

4. As shown in FIG. 16, a partial stacking mode is used. The first soft inflatable bag 1*a* is in a bent shape as a whole, and its left end is filled with a thicker first flexible filler 6*a*. Its upper right side is filled with a thinner third flexible filler 6*c*. The second soft inflatable bag 1*b* is located under the middle and right part of the first soft inflatable bag 1*a*. In this state, it is also easy to achieve the requirements of different softness or hardness states at different portions. In FIG. 16, the first soft inflatable bag 1*a* is independently controlled by the first throttle valve 4*a* and the first one-way check valve 5*a*, and the second soft inflatable bag 1*b* is independently controlled by the second throttle valve 4*b* and the second one-way check valve 5*b*.

In other embodiments, a larger number of, for example, four, five, or more soft inflatable bags 1 may be arranged as required.

In this embodiment, each throttle valve 4 may be selected from an electronic control valve, and an input module and a controller are arranged corresponding to the electronic control valve. When the occupant inputs signals requiring the above-mentioned different soft states by means of the input module, the controller controls different electronic control valves to be opened or closed to achieve the softness or hardness required in different states described above.

Figure 17:
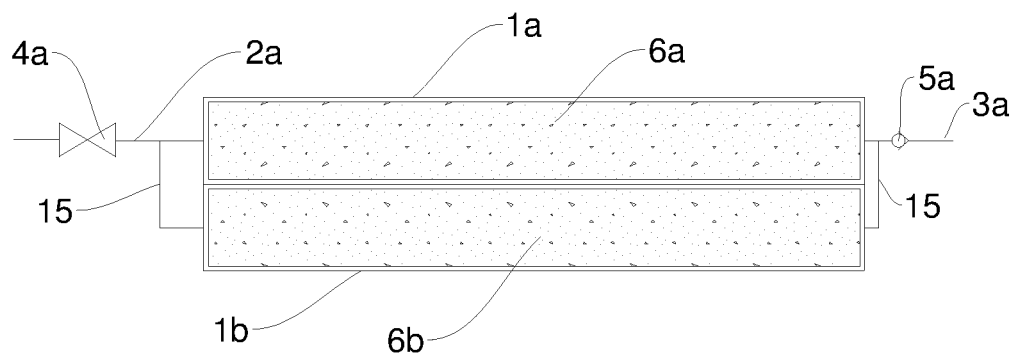
FIG. 17 is a schematic diagram of a fourteenth softness adjusting device for a vehicle seat according to an embodiment of the present disclosure.
Figure 18:
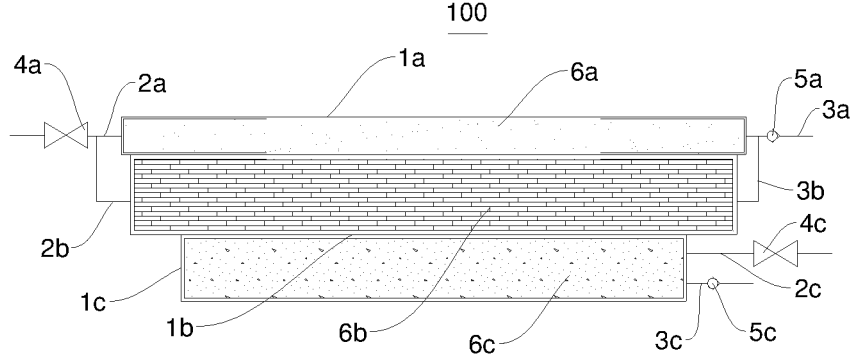
FIG. 18 is a schematic diagram of a fifteenth softness adjusting device for a vehicle seat according to an embodiment of the present disclosure.

In the summary of the foregoing embodiments of the plurality of soft inflatable bags 1, each soft inflatable bag 1 is provided with an independent valve component 40. The independent arrangement of the valve components 40 allows the soft and hard states of the above-mentioned soft inflatable bags 1 to be adjusted separately to achieve the multi-level adjustment of soft and hard states. In other embodiments, as shown in FIG. 17, all the plurality of soft inflatable bags 1 may share the valve component 40, that is, the throttle valve 4 and the one-way check valve 5. Air paths in the soft inflatable bags 1 sharing the valve component 40 are interconnected and adjusted simultaneously to have the same soft or hard state. Alternatively, as shown in FIG. 18, some of the soft inflatable bags share the valve component 40. Air paths in the soft inflatable bags 1 sharing the valve component 40 are interconnected and adjusted simultaneously to have the same soft or hard state.

Figure 19:
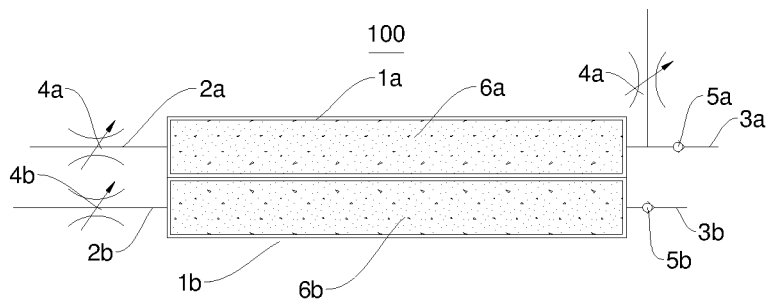
FIG. 19 is a schematic diagram of a sixteenth softness adjusting device for a vehicle seat according to an embodiment of the present disclosure.

Here, in the above-mentioned multi-level adjustment mode, as shown in FIG. 19, a throttle valve 4 with a flow adjustment function may also be used for the soft inflatable bag 1. In other words, the first throttle valve 4*a* individually controlling the first soft inflatable bag 1*a* has a flow adjustment function, and the second throttle valve 4*b* individually controlling the second soft inflatable bag 1*b* also has a flow adjustment function.

Figure 20:
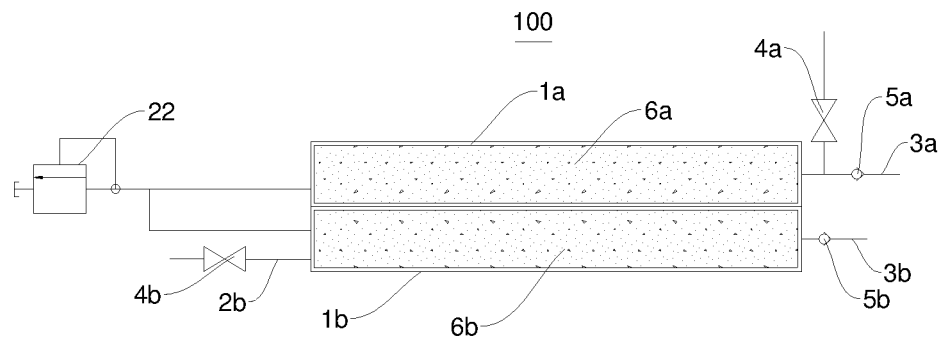
FIG. 20 is a schematic diagram of a seventeenth softness adjusting device for a vehicle seat according to an embodiment of the present disclosure.
Figure 21:
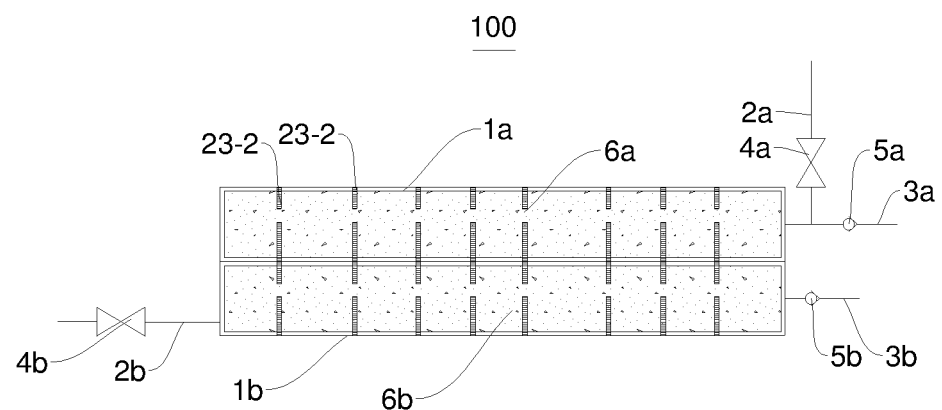
FIG. 21 is a schematic diagram of an eighteenth softness adjusting device for a vehicle seat according to an embodiment of the present disclosure.

Here, in the above-mentioned multi-level adjustment mode, as shown in FIG. 20, the valve component 40 of the soft inflatable bag 1 may also be provided with an overflow valve 22. In FIG. 20, the overflow valve 22 acts on both the first soft inflatable bag 1*a* and on the second soft inflatable bag 1*b*. Alternatively, as shown in FIG. 21, height limiting structures 23, specifically, built-in height limiting straps 23-2, are arranged in the soft inflatable bag 1. Of course, penetrating-type height limiting straps 23-1 may also be arranged.

Figure 22:
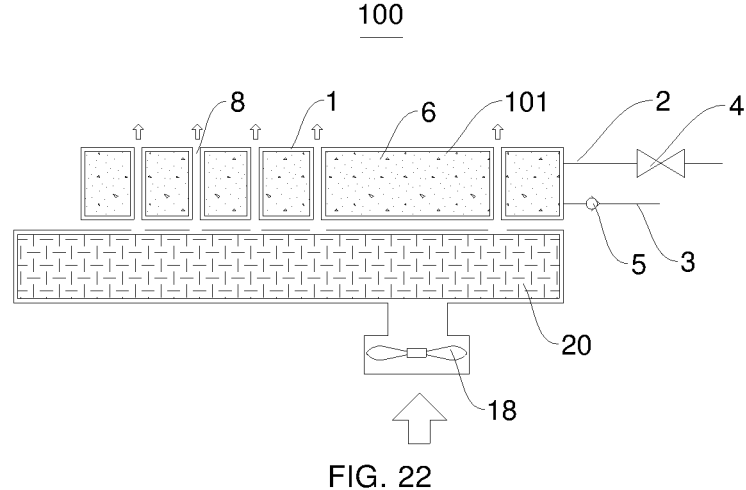
FIG. 22 is a schematic diagram of a nineteenth softness adjusting device for a vehicle seat according to an embodiment of the present disclosure.

As shown in FIG. 22, in the softness adjusting device 100 for a vehicle seat according to this embodiment, the soft inflatable bag 1 is provided with a number of air guide channels 8 distributed to extend therethrough. The air guide channels 8 are isolated from the cavity 101 of the soft inflatable bag 1 and configured to conduct gas on both sides of the soft inflatable bag 1.

The softness adjusting device 100 for a vehicle seat according to this embodiment is suitable for use in a vehicle seat with a ventilation function. It is easy to guide wind generated by a fan 18 and an air guiding pocket 20 under the vehicle seat from the bottom plate of the seat to the sitting surface of the seat. In other words, the wind generated during operation of the fan 18 located at the bottommost side is guided through the air guiding pocket 20 thereabove and then enters the bottom of the soft inflatable bag 1 above the air guiding pocket 20, and finally flows out from the top of the soft inflatable bag 1 through the air guide channels 8 of the soft inflatable bag 1.

Figure 23:
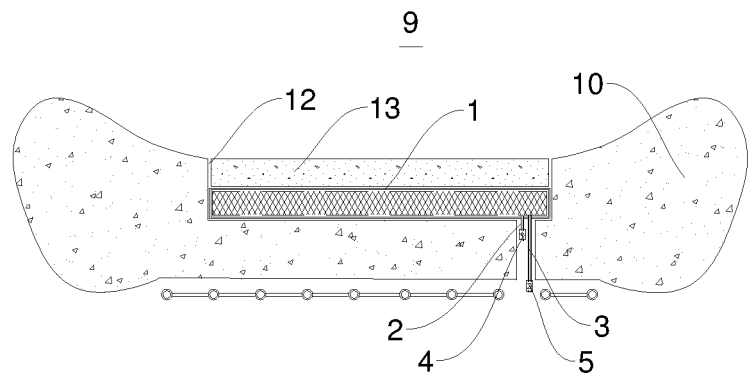
FIG. 23 is a schematic diagram of a first vehicle seat according to an embodiment of the present disclosure.
Figure 24:
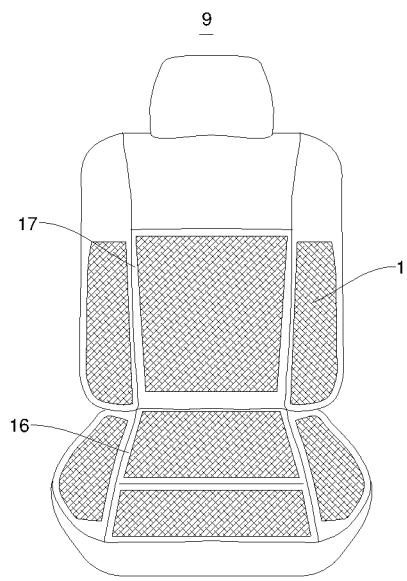
FIG. 24 is a schematic diagram of a second vehicle seat according to an embodiment of the present disclosure.

As shown in FIGS. 23 and 24, this embodiment further provides a vehicle seat 9. The vehicle seat 9 includes a seat foam 10 and a seat cover 11 (shown in FIG. 9) covering the seat foam 10. The softness adjusting device for a vehicle seat mentioned above is arranged between the seat foam 10 and the seat cover 11.

An inflatable bag reserving groove 12 is provided in a side of the seat foam 10 adjacent to the seat cover 11. The soft inflatable bag 1 is placed in the inflatable bag reserving groove 12. A covering layer 13 located above the soft inflatable bag 1 is arranged in the inflatable bag reserving groove 12. The covering layer 13 may be, for example, a sponge layer, a fabric layer, or a non-woven material layer and is configured to protect the soft inflatable bag 1. In other embodiments, the covering layer 13 may be located outside the inflatable bag reserving groove 12 and located between the seat foam 10 and the seat cover 11.

With reference to FIG. 24, the soft inflatable bag 1 may be located at the seat cushion 16 of the vehicle seat 9, or may be arranged at the backrest 17 or at the side wings of the seat.

Figure 25:
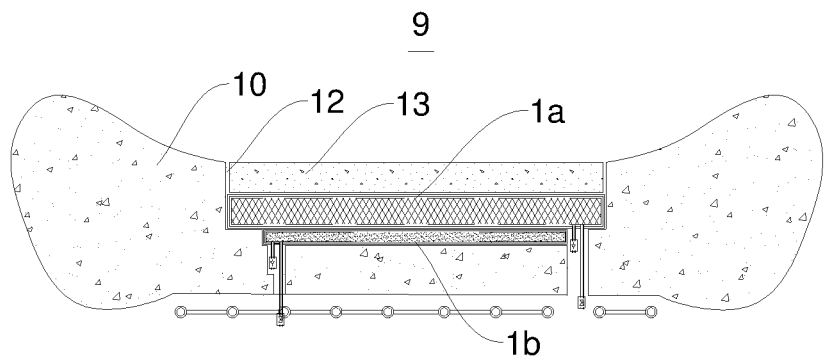
FIG. 25 is a schematic diagram of a third vehicle seat according to an embodiment of the present disclosure.
Figure 26:
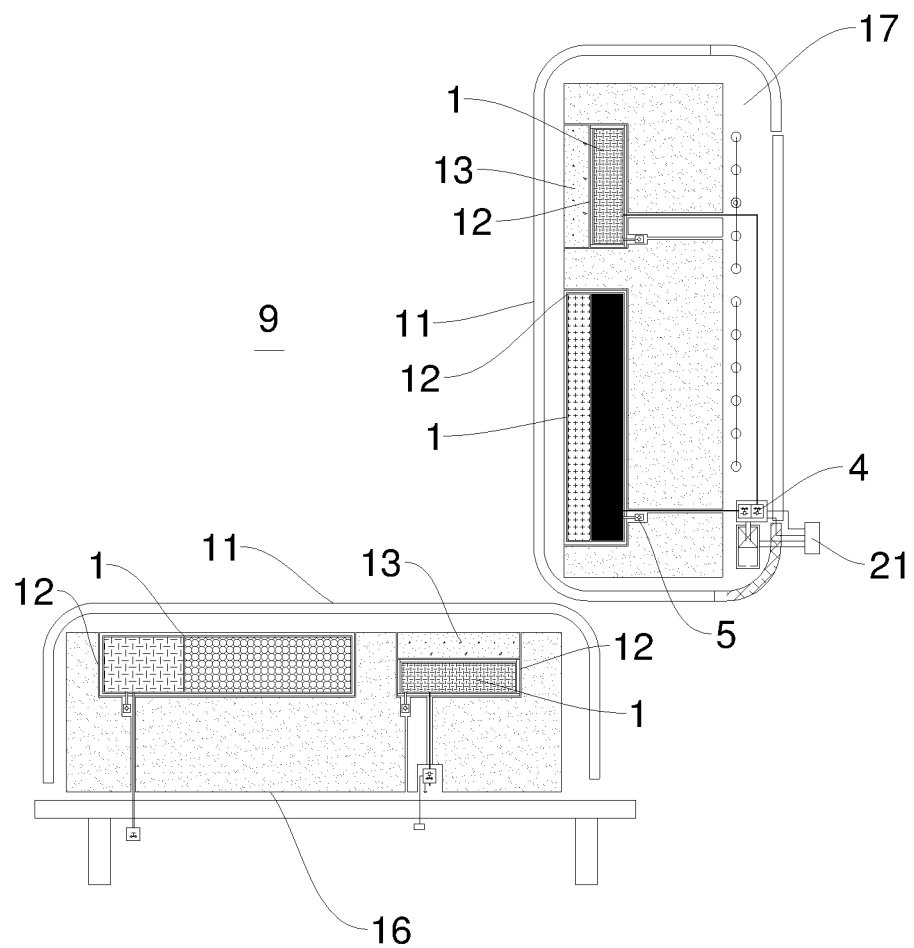
FIG. 26 is a schematic diagram of a fourth vehicle seat according to an embodiment of the present disclosure.
Figure 27:
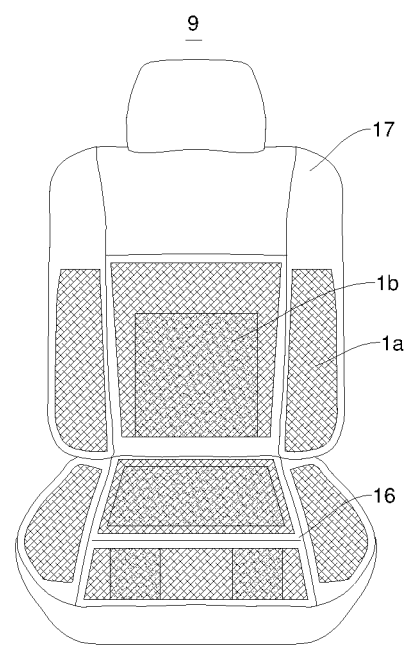
FIG. 27 is a schematic diagram of a fifth vehicle seat according to an embodiment of the present disclosure.

As shown in FIGS. 25 to 27, the same seat portion may be provided with a plurality of inflatable bag reserving grooves 12. Each inflatable bag reserving groove 12 may be provided with a different number of soft inflatable bags 1. The soft inflatable bags 1 in each inflatable bag reserving groove 12 may share a throttle valve 4 as shown at the backrest 17 in FIG. 26, or may be provided with separate throttle valves 4 as shown at the seat cushion 16 in FIG. 26. The throttle valve 4 may, for example, be a manual valve or an electronic valve. As shown at the backrest 17 in FIG. 26, the throttle valve 4 is further connected with a manual switch 21. The opening and closing of the throttle valve 4 are controlled by the manual switch 21. The soft inflatable bags 1 in each inflatable bag reserving groove 12 may be filled with different flexible fillers 6.

Figure 28:
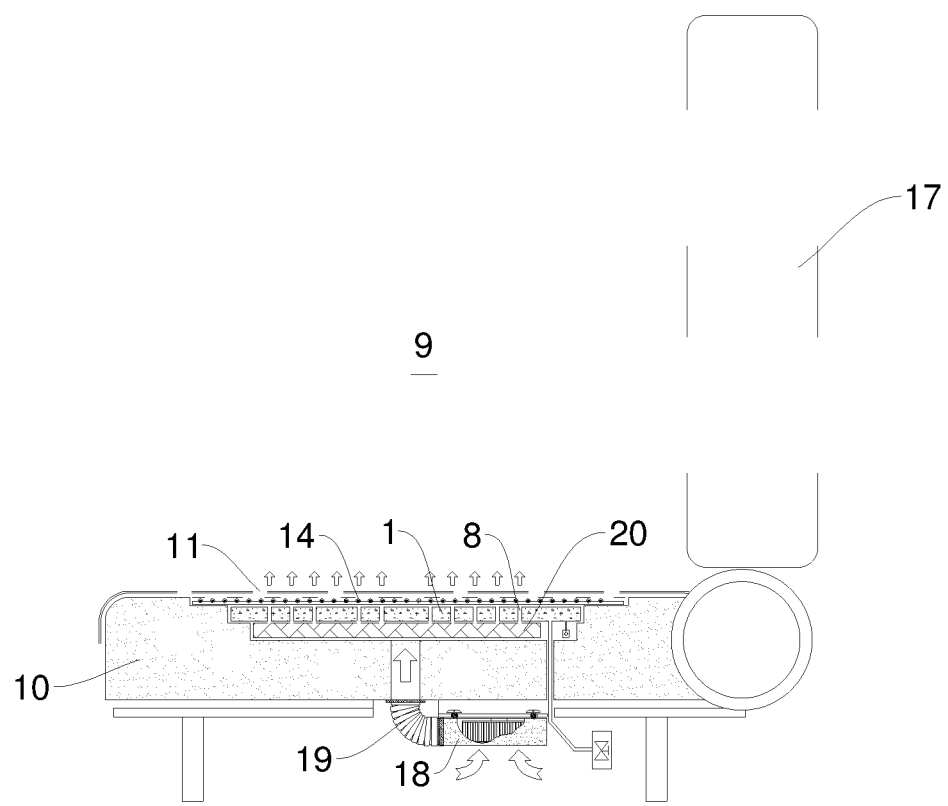
FIG. 28 is a schematic diagram of a sixth vehicle seat according to an embodiment of the present disclosure.

As shown in FIG. 28, the soft inflatable bag 1 may also be provided with air guide channels 8. In other words, in this embodiment, the vehicle seat 9 has a ventilation function, and optionally also has a heating function. A heating pad 14 is arranged between the seat foam 10 and the seat cover 11. A fan 18 blows air into an air guiding pocket 20 through an air ventilation pipe 19, and the wind from the air guiding pocket 20 is further blown to one side of the seat cover 11 through the air guide channels 8, thereby providing an occupant with a more comfortable sitting experience.

Figure 29:
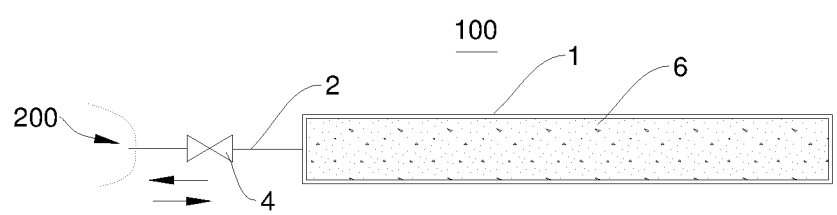
FIG. 29 is a schematic diagram of a twentieth softness adjusting device for a vehicle seat according to an embodiment of the present disclosure.

In the foregoing embodiment, the soft inflatable bag 1 may be replaced with a structure as shown in FIG. 29. In other words, the valve component 40 comprises only the throttle valve 4. In other words, the softness adjusting device 100 for a vehicle seat is configured to be arranged under the seat cover 11 of the vehicle seat 9. The softness adjusting device 100 for a vehicle seat includes a soft inflatable bag 1 and a throttle valve 4 arranged outside the soft inflatable bag 1. The throttle valve 4 is configured to block or communicate a gas in the soft inflatable bag 1 from or with an external air source 200. The soft inflatable bag 1 is filled with at least one flexible filler 6. Specifically, a first air path 2 is connected to the outside of the soft inflatable bag 1, and the throttle valve 4 is mounted in the first air path 2. The hardness and softness of the seat can be achieved by merely opening and closing the throttle valve 4. In this case, the seat can provide three states of softness or hardness:

1. In a soft state, the throttle valve 4 is opened. A person is sitting in the seat. The seat surface is squeezed to discharge air and thus is in a soft state. When the human body leaves the seat, the gas is supplemented from the external air source 200 to the soft inflatable bag 1 through the throttle valve 4, and the seat surface is restored to its original state.

2. In a hard state, the throttle valve 4 is closed. After the human body is seated, the space is squeezed, the gas is compressed, the pressure is greater than the outside atmospheric pressure, and the soft inflatable bag 1 becomes hard.

3. Transition State:

3.1 When the seat is currently in the hard state, the throttle valve 4 is in the closed state. At this time, if a passenger wants the seat surface to become soft, the throttle valve 4 may be opened to allow discharge of some gas and then closed. Alternatively, the throttle valve 4 is kept in the open state when the seat surface becomes soft. After the human body leaves the seat surface, it is necessary to open the throttle valve 4 to restore the seat surface to its original state.

3.2 When the seat is currently in the soft state, the throttle valve 4 is brought into the open state. At this time, if it is desired to adjust the seat to the hard state, the human body should reduce the sitting pressure on the seat or leave the seat surface, so that air at atmospheric pressure is introduced into the soft inflatable bag 1 through the throttle valve 4, and then the throttle valve 4 is closed. When the human body is sitting in the seat again, the seat may become hard.

This embodiment also provides a vehicle, which includes the vehicle seat 9 described above. The vehicle may also include other structures, such as a body, a frame, an engine, a chassis, wheels, a clutch, an electric motor, a steering wheel, and so on. All these structures are known in the prior art and may be implemented with direct reference to the well-developed technical solutions in the prior art. Of course, the vehicle seat 9 is not only limited to being assembled in vehicles and is applicable to scenarios such as trains, high-speed trains, airplanes, and ships.

The above description is merely illustrative of specific embodiments of the present disclosure and illustrative of the utilized technical principles. It should be understood by those skilled in the art that the scope of the invention involved in the present disclosure is not limited to the technical solutions formed by specific combinations of the foregoing technical features, and should also encompass other technical solutions formed by any combinations of the foregoing technical features or their equivalents without departing from the inventive concept, e.g., technical solutions formed by replacing the foregoing features with the technical features having similar functions disclosed in (but not limited to) the present disclosure or vice versa.

INDUSTRIAL APPLICABILITY

In summary, the present disclosure provides a softness adjusting device for a vehicle seat, a vehicle seat, and a vehicle, which enables the adjustment of softness of the seat and is manufactured with low cost.

What is claimed is:

1. A softness adjusting device for a vehicle seat, configured to be arranged under a seat cover of the vehicle seat, the softness adjusting device for the vehicle seat comprising:
   at least one soft inflatable bag; and
   a valve component arranged outside the at least one soft inflatable bag, the valve component comprising:
     a throttle valve configured to block or communicate a gas in the at least one soft inflatable bag from or with an external air source; and
     a one-way check valve having a flow direction from outside to inside and configured to fill the at least one soft inflatable bag by the external air source when a pressure of the external air source is greater than air pressure in a cavity of the at least one soft inflatable bag, the at least one soft inflatable bag being filled with at least one flexible filler.

2. The softness adjusting device for a vehicle seat according to claim 1, wherein:
   the softness adjusting device for the vehicle seat further comprises:
     a first air path; and
     a second air path, wherein:
       the first air path and the second air path lead to the cavity of the at least one soft inflatable bag;
       the throttle valve is mounted in the first air path; and
       the one-way check valve is mounted in the second air path; and
   the softness adjusting device for the vehicle seat further comprises a main air pipe, wherein one end of the main air pipe communicates with the cavity of the at least one soft inflatable bag, and the other end of the main air pipe communicates with both one end of the first air path and one end of the second air path.

3. The softness adjusting device for a vehicle seat according to claim 1, wherein the valve component further comprises an overflow valve configured to discharge gas from the at least one soft inflatable bag so that a pressure in the at least one soft inflatable bag is reduced to a set pressure when the pressure in the at least one soft inflatable bag is greater than or equal to the set pressure.

4. The softness adjusting device for a vehicle seat according to claim 3, wherein at least two of the throttle valve, the one-way check valve, and the overflow valve are arranged integrally.

5. The softness adjusting device for a vehicle seat according to claim 1, wherein the at least one soft inflatable bag comprises a height limiting structure configured to limit an expansion height of the at least one soft inflatable bag when squeezed.

6. The softness adjusting device for a vehicle seat according to claim 5, wherein:
   the height limiting structure comprises penetrating-type height limiting straps and/or built-in height limiting straps arranged in a distributed manner,
   each of the penetrating-type height limiting straps comprise:
     an I-shaped vertical section;
     two ends protruding beyond the at least one soft inflatable bag; and
     a vertical portion located in the at least one soft inflatable bag; and
   each of the built-in height limiting straps comprise two ends fixed to upper and lower inner surfaces of the at least one soft inflatable bag, respectively.

7. The softness adjusting device for a vehicle seat according to claim 1, wherein the throttle valve is a manual valve or a solenoid valve.

8. The softness adjusting device for a vehicle seat according to claim 1, wherein:
the at least one soft inflatable bag is composed of two or more sub-bags, and the sub-bags communicate with each other via a connecting tube.

9. The softness adjusting device for a vehicle seat according to claim 1, wherein the at least one soft inflatable bag has a thickness ranging from one centimeter to five centimeters.

10. The softness adjusting device for a vehicle seat according to claim 1, wherein:
soft inflatable bags are in a number greater than or equal to two, and
all or some of a plurality of the soft inflatable bags are arranged in a stacked manner.

11. The softness adjusting device for a vehicle seat according to claim 10, wherein each of the plurality of the soft inflatable bags is provided with an independent valve component, or the valve component is shared by all or some of the plurality of the soft inflatable bags.

12. The softness adjusting device for a vehicle seat according to claim 1, wherein:
the at least one soft inflatable bag is provided with several air guide channels distributed to extend therethrough, and
the air guide channels are isolated from the cavity of the at least one soft inflatable bag and are configured to conduct gas on both sides of the at least one soft inflatable bag.

13. The softness adjusting device for a vehicle seat according to claim 1, wherein the flexible filler is at least one of sponge, aerosol, a three-dimensional woven fabric, a rubber elastic structure, and a fiber cushion layer.

14. The softness adjusting device for a vehicle seat according to claim 2, wherein:
the valve component further comprises an overflow valve, and
the overflow valve is configured to discharge gas from the at least one soft inflatable bag, so that a pressure in the at least one soft inflatable bag is reduced to a set pressure, when the pressure in the at least one soft inflatable bag is greater than or equal to the set pressure.

15. A vehicle seat comprising:
a seat foam;
a seat cover covering the seat foam; and
a softness adjusting device arranged between the seat foam and the seat cover, the softness adjusting device comprising:
at least one soft inflatable bag;
a valve component arranged outside the at least one soft inflatable bag, the valve component comprising:
a throttle valve configured to block or communicate a gas in the at least one soft inflatable bag from or with an external air source; and
a one-way check valve having a flow direction from outside to inside and configured to fill the at least one soft inflatable bag by the external air source when a pressure of the external air source is greater than air pressure in a cavity of the at least one soft inflatable bag, the at least one soft inflatable bag being filled with at least one flexible filler.

16. The vehicle seat according to claim 15, wherein:
an inflatable bag reserving groove is provided in a side of the seat foam adjacent to the seat cover; and
the at least one soft inflatable bag is placed in the inflatable bag reserving groove.

17. The vehicle seat according to claim 15, wherein a covering layer is arranged between the at least one soft inflatable bag and the seat cover.

18. The vehicle seat according to claim 15, wherein a heating pad is arranged between the seat foam and the seat cover.

19. The vehicle seat according to claim 15, wherein:
an air guiding pocket is arranged under the at least one soft inflatable bag, and
a fan is arranged under the air guiding pocket.

* * * * *